United States Patent
Paleczny et al.

(10) Patent No.: US 8,260,377 B2
(45) Date of Patent: Sep. 4, 2012

(54) GASKET FOR A MOBILE DEVICE HAVING A TOUCH SENSITIVE DISPLAY

(75) Inventors: Todd Robert Paleczny, Heidelberg (CA); Patrick Smittmatter, Frisco, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 506 days.

(21) Appl. No.: 12/437,171

(22) Filed: May 7, 2009

(65) Prior Publication Data

US 2010/0285850 A1    Nov. 11, 2010

(51) Int. Cl.
*H04M 1/00* (2006.01)
(52) U.S. Cl. .............. 455/575.1; 345/156; 345/173
(58) Field of Classification Search ........... 455/550.1, 455/575.1, 575.3, 575.4, 575.8; 345/156, 345/173; 379/433.01–433.09, 433.1, 433.11, 379/433.12
See application file for complete search history.

(56) References Cited

U.S. PATENT DOCUMENTS

| | | | |
|---|---|---|---|
| 5,002,368 A | 3/1991 | Anglin | |
| 5,016,987 A | 5/1991 | Smith, Jr. | |
| 5,169,693 A | 12/1992 | Fujimura | |
| 5,332,238 A | 7/1994 | Borucki | |
| 5,479,285 A | 12/1995 | Burke | |
| 5,568,357 A | 10/1996 | Kochis et al. | |
| 5,784,054 A | 7/1998 | Armstrong et al. | |
| 6,064,453 A | 5/2000 | Inubushi et al. | |
| 6,532,152 B1 | 3/2003 | White et al. | |
| 6,545,733 B2 | 4/2003 | Kaga et al. | |
| 6,864,943 B2 | 3/2005 | Hirakata et al. | |
| 6,897,852 B2 | 5/2005 | Grosfeld et al. | |
| 7,109,976 B2 | 9/2006 | Cobian | |
| 7,183,948 B2 | 2/2007 | Roberts | |
| 7,267,313 B2 | 9/2007 | Krzoska et al. | |
| 7,301,761 B2 | 11/2007 | Merz et al. | |
| 7,342,573 B2 | 3/2008 | Ryynänen | |
| 7,379,128 B2 | 5/2008 | Tsubokura et al. | |
| 7,436,396 B2 | 10/2008 | Akieda et al. | |
| 7,457,111 B2 | 11/2008 | Merz et al. | |
| 2002/0149571 A1 | 10/2002 | Roberts | |
| 2003/0184514 A1 | 10/2003 | Grosfeld et al. | |
| 2004/0127270 A1* | 7/2004 | Wulff et al. | 455/575.4 |
| 2004/0155991 A1 | 8/2004 | Lowles et al. | |

(Continued)

FOREIGN PATENT DOCUMENTS

EP    1 691 263 A    8/2006

(Continued)

OTHER PUBLICATIONS

European Search Report for European Patent Application EP 09 15 9685 dated Aug. 19, 2009.

*Primary Examiner* — George Eng
*Assistant Examiner* — Dinh P Nguyen
(74) *Attorney, Agent, or Firm* — Quarles & Brady LLP

(57) ABSTRACT

A mobile device is disclosed that includes a housing, a touch sensitive display subassembly, and a gasket. The touch sensitive display subassembly is received in the housing and is movable relative to the housing. The touch sensitive display subassembly includes a lens overlaying a display. The gasket is attached to only one of the housing and the touch sensitive display subassembly. This gasket inhibits passage of debris between the housing and the touch screen display subassembly.

13 Claims, 8 Drawing Sheets

U.S. PATENT DOCUMENTS

2004/0156168 A1   8/2004   Le Vasseur et al.
2005/0052425 A1   3/2005   Zadesky et al.
2006/0146486 A1*  7/2006   Wikstrom et al. ............ 361/681
2007/0252819 A1* 11/2007   Peters et al. .................. 345/173
2008/0280657 A1  11/2008   Maenpaa et al.

FOREIGN PATENT DOCUMENTS

EP      1 983 411 A     10/2008
WO      2008/030594 A    3/2008

* cited by examiner

GASKET FOR A MOBILE DEVICE HAVING A TOUCH SENSITIVE DISPLAY

BACKGROUND

This disclosure relates to mobile devices. More specifically, the disclosure is directed at mobile devices including touch sensitive displays.

A primary benefit of a mobile device such as, for example, a BlackBerry™ is its portability. As the mobile device is not physically tethered to a specific location, the user can operate the mobile device almost anywhere. However, the portable nature of the mobile device also means that the mobile device may be constantly handled and, thus, is exposed to a wide array of potentially harmful conditions.

Increasingly, such mobile devices include touch sensitive displays instead of the conventional separate display and controls. Unlike mobile devices having a display and controls that are separate, touch sensitive displays combine a display for the presentation of a user interface and one or more sensors for detecting when a portion of the touch sensitive display has been contacted by a user. As touching or depression are common events for detection by the sensors, the touch sensitive display may need to be displaceable relative to the housing of the mobile device depending on the particular touch screen technology that is employed.

However, after repeated use and exposure to various environmental conditions, the mechanical components of the touch sensitive display or their responsiveness to user operation may degrade.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
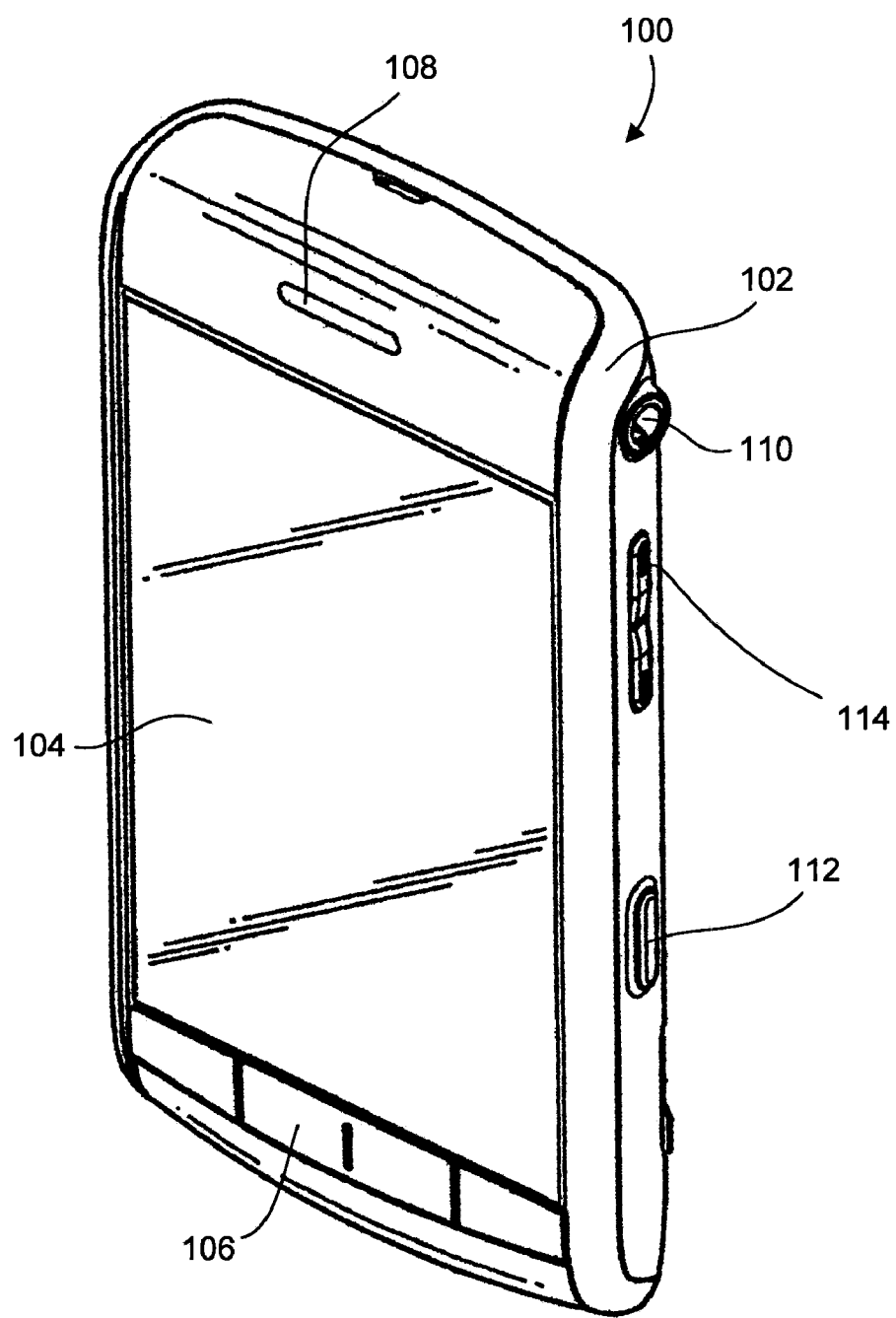
FIG. 1 is an isometric view of a mobile device including a touch sensitive display.

A mobile device is disclosed that includes a housing, a touch sensitive display subassembly, and a gasket. The touch sensitive display subassembly is received in the housing and is movable relative to the housing. The touch sensitive display subassembly includes a lens overlaying a display. The gasket is attached to only one of the housing and the touch sensitive display subassembly. This gasket inhibits passage of debris between the housing and the touch screen display subassembly.

In some forms, the gasket may be attached to the touch sensitive display subassembly and substantially forms a seal between a perimeter of the lens and a perimeter of the touch sensitive display subassembly to inhibit passage of debris between the lens and the display. In one form, the gasket may be located between the lens and a tray supporting the display. In this form, the touch sensitive display subassembly may be movable between a first position in which the gasket further contacts the housing to substantially form a seal between the housing and the touch sensitive display subassembly, and a second position in which at least a portion of the gasket is separated from the housing. In another form, the gasket may be located between the lens and a bezel of the display. The gasket may further include a rib that extends toward a facing wall of the housing of the mobile device to inhibit passage of debris between the housing and the touch sensitive display subassembly.

In other forms, the gasket may include a shedding portion and a centering portion. The shedding portion may be located proximate a gap between the housing and the lens and shaped so as to direct any debris passing through the gap away from the touch sensitive display subassembly. The centering portion may contact a periphery of the touch sensitive display to urge the touch sensitive display subassembly toward a centered position within the housing.

In one form, this gasket including shedding and centering portions may be attached to the housing. The centering portion may be curved and at least a portion of the centering portion may form a sliding seal between the gasket and the touch sensitive display subassembly. The centering portion may include a convex surface and may extend from the shedding portion to a terminal end. The convex surface may form the sliding seal with one of the touch sensitive display subassembly and the housing and the terminal end may contact the other of the touch sensitive display subassembly and the housing. The centering portion may further include a concave surface opposing the convex surface. The concave surface may face a space between the centering portion and one of the touch sensitive display subassembly and the housing for deflection of the centering portion. The convex surface and the concave surface may define a section of the centering portion having a substantially constant wall thickness.

In other forms, the gasket may be composed of an elastically deformable polymeric material.

In still other forms, the gasket may provide improved impact resistance upon a drop of the mobile device. The gasket may include a rib that contacts a facing wall of the housing to cushion an impact of the drop when the mobile device is dropped and the drop causes the rib of the touch sensitive display subassembly to move laterally towards the facing wall of the housing. The gasket may include an upwardly facing surface that contacts a downwardly facing surface of the housing to cushion an impact of the drop when the mobile device is dropped and the drop causes the touch sensitive display subassembly to move in a direction perpendicular to a plane of the lens.

In yet another form, the gasket may be attached to the touch sensitive display subassembly and may include a body section with a fin extending from the body section. The body section may reside in a pocket defined at least in part by a tray of the touch sensitive display subassembly that also supports the display. The fin may extend upwardly at an angle towards the lens, which the fin abuts. The touch sensitive display subassembly may be movable between a non-contacted position and a contacted position. In the non-contacted position, an upwardly facing surface of the body portion of the gasket contacts a surface of the housing to inhibit the passage of debris into the mobile device. In the contacted position, the upwardly facing surface of the gasket is separated from the surface of the housing.

Another mobile device is disclosed that includes a housing, a touch sensitive display subassembly, and a gasket. The touch sensitive display subassembly is received in the housing and is movable relative to the housing. The touch sensitive display subassembly includes a lens overlaying a display. The gasket is attached to the touch sensitive display subassembly and substantially forms a seal between a perimeter of the lens and a perimeter of the touch sensitive display subassembly to inhibit passage of debris between the lens and the display. The gasket includes a shedding portion and a centering portion. The shedding portion is located proximate a gap between the housing and the lens and is shaped so as to direct any debris passing through the gap away from the touch sensitive display subassembly. The centering portion contacts a periphery of the touch sensitive display to urge the touch sensitive display subassembly toward a centered position within the housing.

Yet another mobile device is disclosed having a housing, a touch sensitive display, and a gasket. Again, the touch sensitive display subassembly is received in the housing and is movable relative to the housing. The touch sensitive display subassembly includes a lens overlaying a display. The gasket attached to the touch sensitive display subassembly and substantially forms a seal between a perimeter of the lens and a perimeter of the touch sensitive display subassembly to inhibit passage of debris between the lens and the display. The touch sensitive display subassembly is movable between a first position in which the gasket further contacts the housing to substantially form a seal between the housing and the touch sensitive display subassembly, and second position in which at least a portion of the gasket is separated from the housing.

Thus, a mobile device is disclosed that has a gasket that prevents various kinds of debris, such as fluids, particulates, or the like, from compromising the operation of a touch sensitive display. Such debris could otherwise enter and collect in a space between the lens and the display, giving the touch sensitive display the appearance of being dirty. When debris collects in a thin volume between the assembled lens and the display, it is not readily cleanable by the user. Further, debris could collect under the touch sensitive display subassembly preventing the full downward deflection of the subassembly or could otherwise contaminate functional components, such as underlying piezoelectric sensors. However, the disclosed mobile device includes a gasket that inhibits the passage of debris into the mobile device and/or directs any debris that enters the mobile device away from the areas of the mobile device that would impair the operation or appearance of the touch sensitive display.

As the gasket is attached to one of the housing and the touch sensitive display subassembly, but not the other, the ease of movement of the touch sensitive display subassembly is only minimally limited. Unlike a hermitic seal connected to both the housing and the touch sensitive display, the disclosed gaskets allow for more freedom of movement of the touch sensitive display relative to the housing as the sealing force is low.

Additionally, the gasket may act as a shock absorber if the mobile device is dropped. The gasket may cushion sudden impacts in a direction of deflection (along the Z-axis) of the touch sensitive display, in directions perpendicular to the direction of deflection (in the X-Y plane), or in a combination of multiple directions.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

Referring first to FIG. 1, a mobile device 100 is shown. The mobile device 100 is preferably a two-way communication device, but could be any kind of mobile device 100 including, but not limited to, cellular phones, personal digital assistants, and the like. The mobile device 100 may be used as a phone, a digital media player, a camera, an e-mail client, an application platform, as well as many other functional uses for a mobile device that are known to those skilled in the art.

The mobile device 100 includes a housing 102 that supports the various components of the mobile device 100. Most prominently, a touch sensitive display 104 is located on the front face the mobile device 100. The touch sensitive display 104 is generally rectangular and extends across the majority of the front face. The touch sensitive display 104 is configured to display a user interface using a liquid crystal display and includes sensors for detecting the touch of a contacting member, such as a finger or a stylus, on the touch sensitive display 104. In addition to detecting the touch of a contacting member, the touch sensitive display 104 may be configured to detect contact pressure above a predetermined threshold and the touch sensitive display 104 may physically deflect or "click" at this threshold, providing the user with haptic feedback of the touch event.

Although the touch sensitive display 104 dominates the front face of the mobile device 100, other components are also located on the housing 102. Proximate the bottom edge of the touch sensitive display 104, a set of shortcut keys 106 are positioned adjacent to the touch sensitive display 104. The shortcut keys 106 provide dedicated buttons for quick access to the portions of the user interface related to particular uses of the mobile device 100, such as phone, email, web browser, or the like. It is contemplated that the shortcut keys 106 need not be dedicated, actuable buttons as shown in FIG. 1, but could be part of the touch sensitive display and include indicia thereon to indicate their functionality. On the other side of the touch sensitive display 104, a speaker 108 is located. Although not shown, a microphone is also located on the mobile device 100.

Along the lateral walls of the mobile device 100, various controls and connectors are located including a headphone jack 110 for connecting a set of headphones to the mobile device 100, a convenience key 112 for performing common tasks (e.g., opening an application, taking a picture using the built in-camera, and the like), volume keys 114 for adjustment of the volume of the speaker 108, and a USB port (not shown) for connecting the mobile device 100 to a computer. However, it is recognized that the mobile device 100 could include fewer or additional controls and connectors, as deemed necessary to suit the application.

Various cross-sectional views of mobile devices similar to the mobile device 100 of FIG. 1 are now disclosed. These cross-sectional views are taken near the interface or seam between the housing and the touch sensitive display of the mobile device. Conventionally, the seam between the housing and the touch sensitive display provides a pathway for debris such as fluid, dust, particulates, dirt, and the like to enter the mobile device. FIGS. 2-8 show various gasket configurations which can be used to prevent exposure of sensitive parts of the touch sensitive display to this debris. It should be appreciated that the shown and described embodiments may include structural differences because of the particular location about the perimeter at which the cross section is taken or because of alterations to the housing or touch sensitive display.

Figure 2:
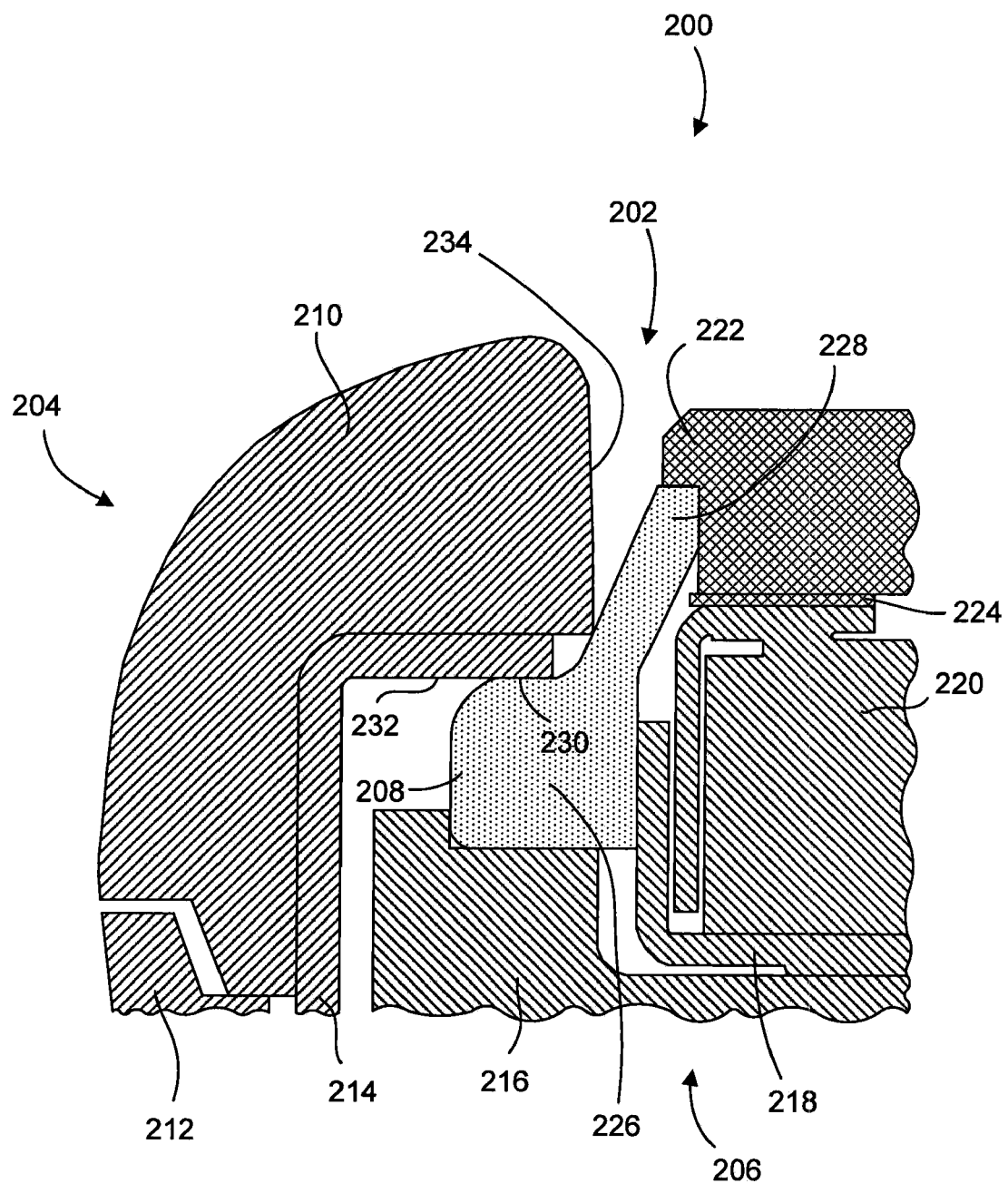
FIG. 2 is a cross-sectional view of one embodiment of a mobile device in which a gasket is located between a housing and a touch sensitive display subassembly, and the gasket is attached to the touch sensitive display subassembly and contacts a tray, a bezel of a display, and a lens of the subassembly.
Figure 3:
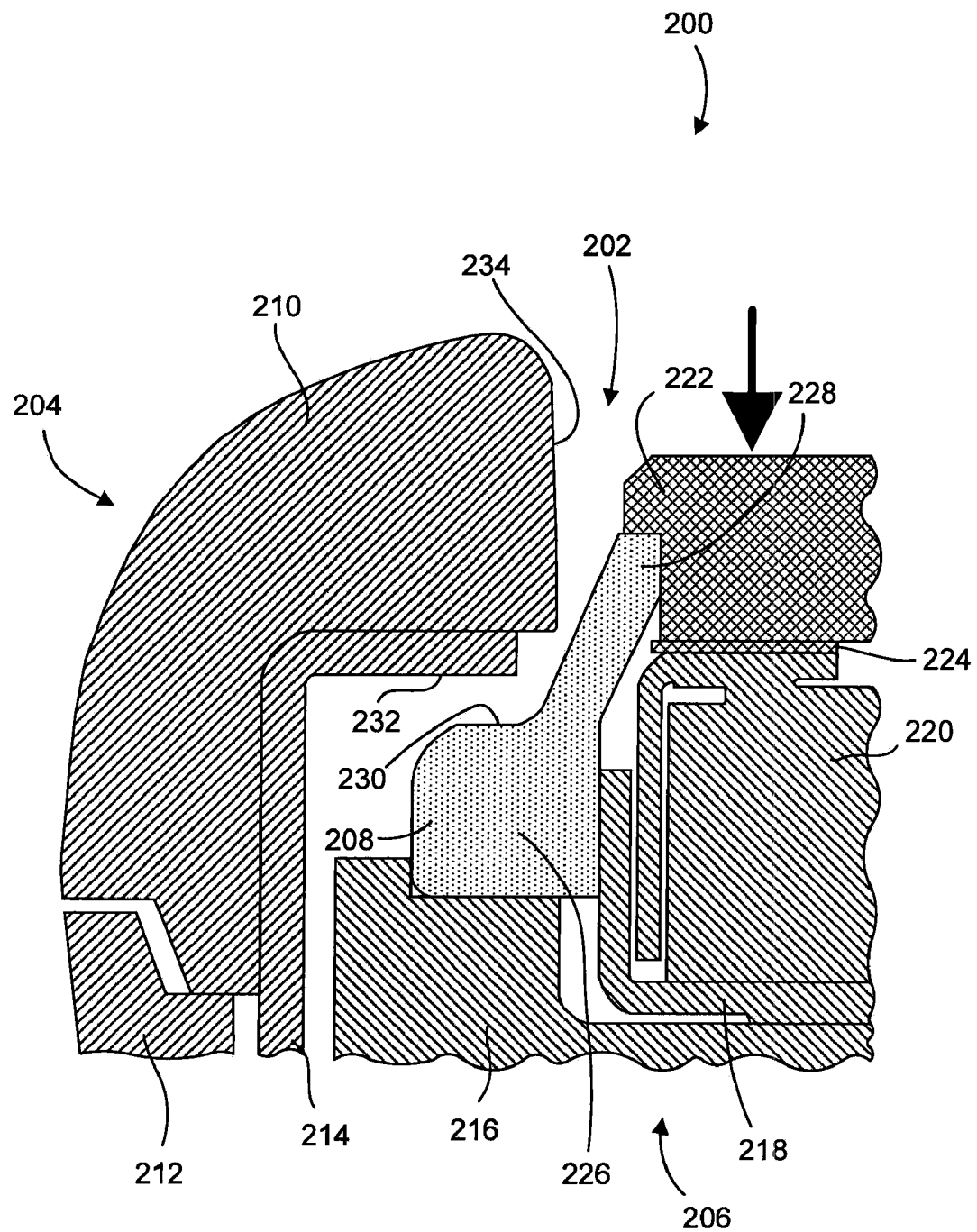
FIG. 3 is a cross-sectional view similar to FIG. 2, but in which the touch sensitive display subassembly has been contacted and is depressed relative to the housing.

Referring now to FIGS. 2 and 3, a detailed cross-sectional view of a mobile device 200 through an area proximate a seam 202 between a housing 204 and a touch sensitive display subassembly 206 is shown. A gasket 208 is attached to the touch sensitive display subassembly 206 and extends about the perimeter of the touch sensitive display subassembly 206. The touch sensitive display subassembly 206 and the attached gasket 208 are movable relative to the housing 204 between a first non-contacted position, such as is shown in FIG. 2, and a second contacted position, such as is shown in FIG. 3.

In the form shown, the housing 204 contains multiple sections. A first exterior housing portion 210 and a second exterior housing portion 212 are made of a hard plastic material to provide a comfortable material for the handling of the mobile device, although it is appreciated that other materials having similar properties may be utilized. The housing 204 further includes a sheet metal portion 214 that adds additional structural strength to the mobile device and may provide a frame for the assembly of the various internal components. The exterior housing portions 210 and 212 and the sheet metal portion 214 may be directly or indirectly joined to each other in any number of ways including fasteners, adhesives, snapping portions formed into the housing members, or the like.

The touch sensitive display subassembly 206 contains many components, including a tray 216 that supports a carrier 218 holding a liquid crystal display 220. A lens 222 overlies the liquid crystal display 220 and is attached by an adhesive 224. The lens 222 provides a surface for contact by the user and protects the liquid crystal display 220 from the direct contact of the contacting member which could cause color distortions in or damage to the liquid crystal display 220.

The tray 216 sits on multiple piezoelectric sensors (not shown) that permit the deflection of the touch sensitive display subassembly 206 relative to the housing 204. As the piezoelectric sensors are typically rigidly attached to both the housing 204 and the tray 216 of the touch sensitive display subassembly 206, when the lens 222 (or other overlying protective layer) of the touch sensitive display subassembly 206 is contacted and deflected relative to the housing 204, the piezoelectric sensors detect this event and relay this information to a processor which can determine the section of the touch sensitive display that has been contacted and determine the type of contact made by the contacting member.

The gasket 208 surrounds the perimeter of the touch sensitive display subassembly 206. In the form shown in FIGS. 2 and 3, the gasket 208 has a body section 226 with a thin fin 228 extending therefrom. The body section 226 resides in a pocket defined between the tray 216 and the carrier 218. The fin 228 extends upwardly at an angle towards the lens 222, which the fin 228 abuts. Although alternate materials with similar properties may be used, the gasket 208 may be composed of a polymeric material such as silicone, which provides the gasket 208 with some elasticity and durability. The gasket 208 may be held in place relative to the touch sensitive display subassembly 206 by adhesives or the like, or the gasket 208 may be held in place by the geometric placement of the surrounding components (i.e. the tray 216, the carrier 218, the lens 222, and the like).

This placement of the gasket 208 prevents debris from the external environment from entering the touch sensitive display subassembly 206 when the subassembly is in either the first non-contacted position or the second contacted position. The gasket 208 isolates the interface between the lens 222 and the liquid crystal display 220 from debris from the external environment.

Further, in some positions, the gasket 208 may prevent debris from entering a space between the touch sensitive display subassembly 206 and the housing 204. When the touch sensitive display subassembly 206 is in the first non-contacted position of FIG. 2, a top surface 230 of the body section 226 of the gasket 208 contacts a bottom surface 232 of the sheet metal portion 214 of the housing 204. This contact prevents the passage of large debris into the mobile device 200.

The gasket 208 may further provide some form of protection against sudden impact if the mobile device 200 is dropped or otherwise jolted. In the form shown, the gasket 208 cushions the movement of the touch sensitive display subassembly 206 in the side-to-side direction, as sudden sideways movement of the touch sensitive display subassembly 206 would drive the fin 228 of the gasket 208 into a facing wall 234 of the housing 204. Likewise, some shock resistance is provided in the direction of deflection of the touch sensitive display subassembly 206, so if the touch sensitive display subassembly 206 is suddenly urged in a direction out of the housing 204, the top surface 230 of the gasket 208 will buffer this movement.

Figure 4:
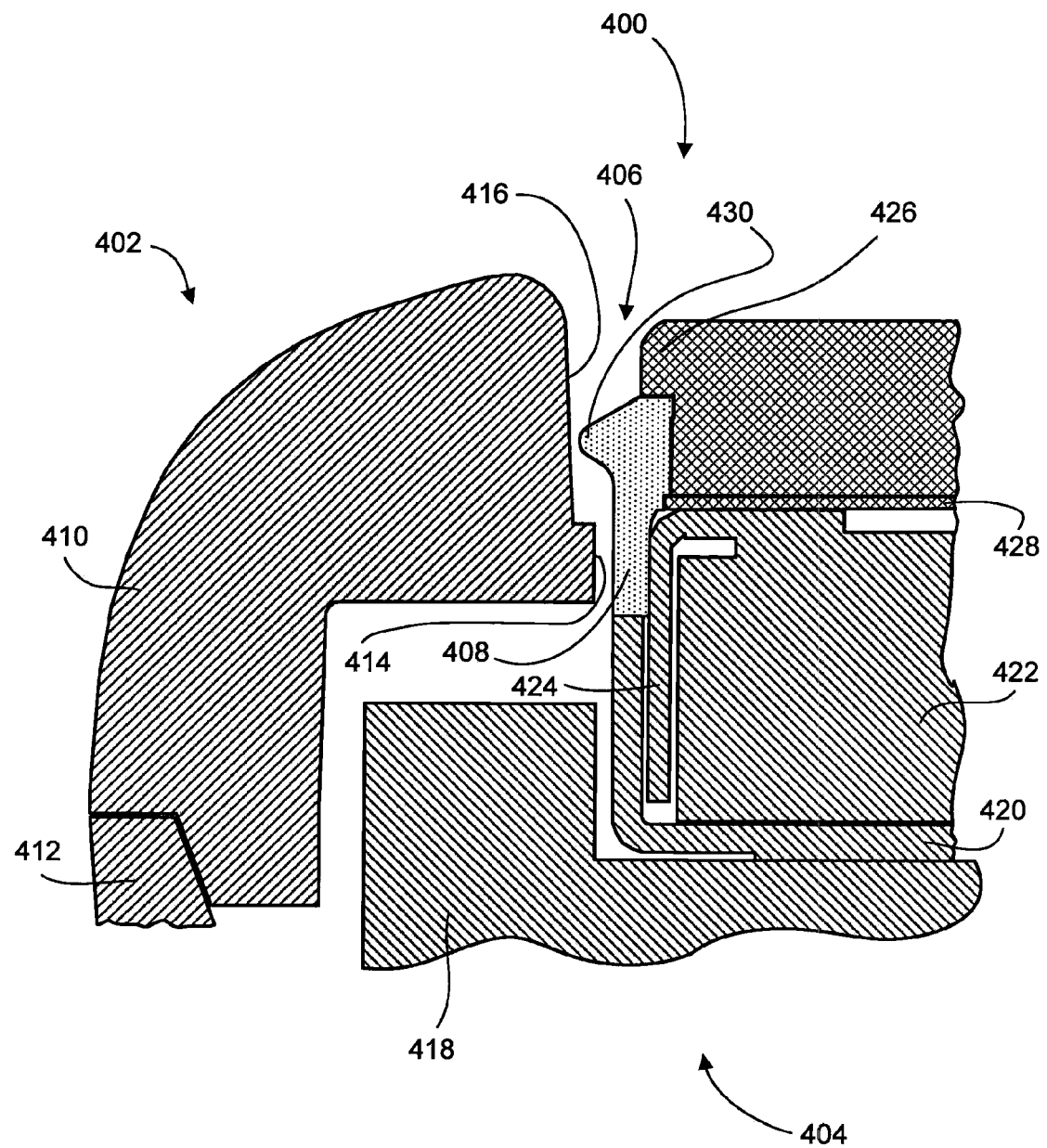
FIG. 4 is a cross-sectional view of another embodiment of a mobile device in which a gasket is attached to the touch sensitive display subassembly, contacts a lens and a bezel of the display, and has a rib extending toward the housing.
Figure 5:
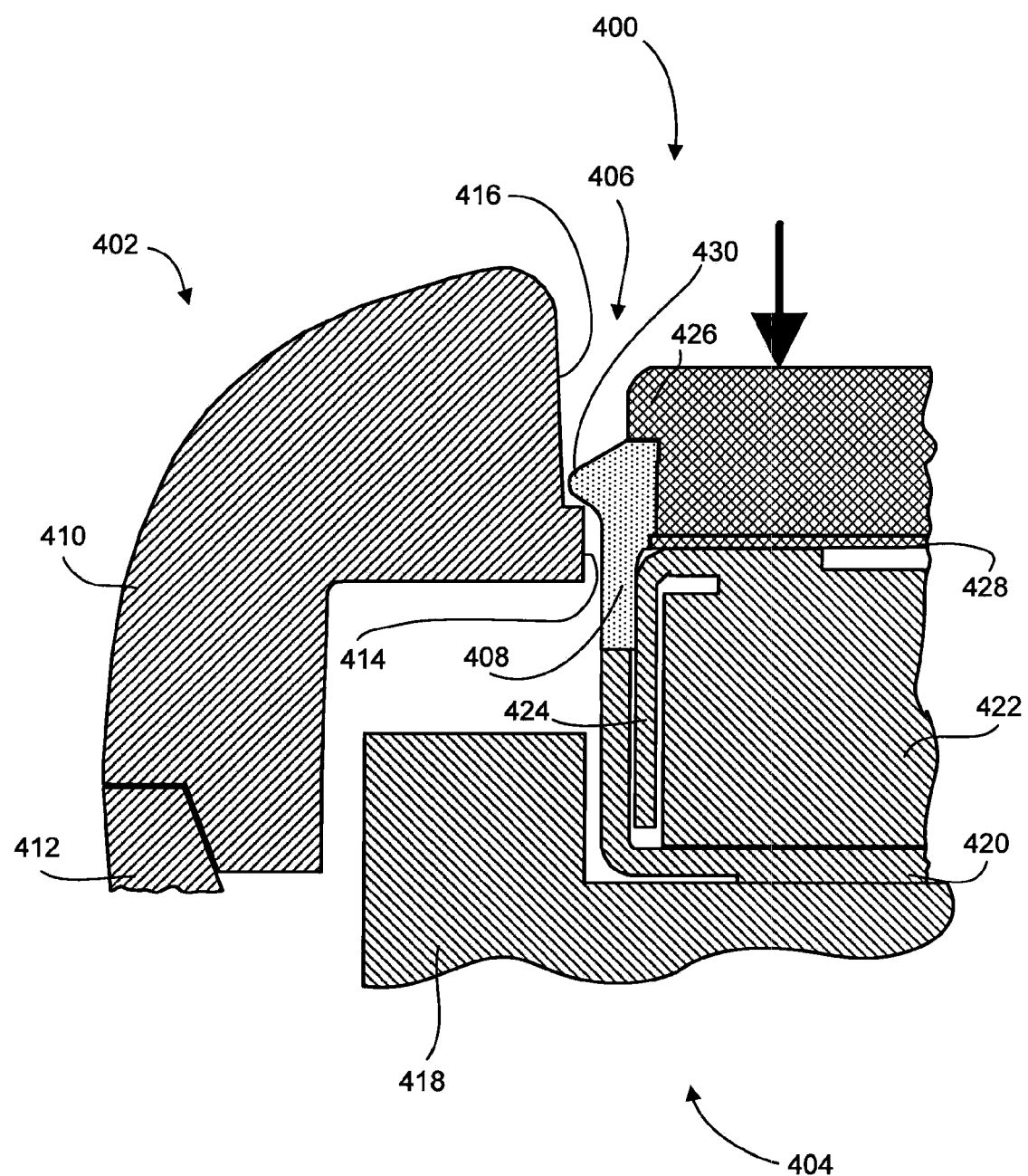
FIG. 5 is a cross-sectional view similar to FIG. 4, but in which the touch sensitive display subassembly has been contacted and is depressed relative to the housing, causing the rib to approach a ledge formed on the housing.

Referring now to FIGS. 4 and 5, a detailed cross-sectional view of another mobile device 400, that is similar, but not identical to the mobile device 200 is shown. The mobile device 400 includes a housing 402 and a touch sensitive display subassembly 404 with a seam 406 therebetween. Again, a gasket 408 is attached to the touch sensitive display subassembly 404 proximate the seam 406 which extends about the periphery of the seam 406.

The housing 402 includes multiple components including a first portion 410 and a second portion 412. In this form, the first portion 410 includes a ledge 414 that extends from a facing wall 416 of the housing 402 towards the touch sensitive display subassembly 404. The ledge 414 could be integrally formed with the first portion 410 of the housing 402, as shown, or a portion of a separately attached component.

Although there are some differences, the touch sensitive display subassembly 404 is similar to the touch sensitive display subassembly shown in FIGS. 2 and 3. The touch sensitive display subassembly 404 includes a tray 418, a carrier 420, a liquid crystal display 422 having a bezel 424, and a lens 426 overlying the liquid crystal display 422 which is attached by an adhesive 428. Again the tray 418 sits on piezoelectric sensors (not shown) or the like which are also connected to the housing 402 to detect any touch or contact of the touch sensitive display subassembly 404.

However, in the form shown in FIGS. 4 and 5, the gasket 408 contacts the lens 426, a top edge of the carrier 420, and the bezel 424 of the liquid crystal display 422. The gasket 408 substantially forms a seal that prevents debris from passing between the lens 426 and the liquid crystal display 422. However, unlike the gasket 208 shown in FIGS. 2 and 3, the gasket 408 does not extend so far down as to contact the tray 418.

The gasket 408 also includes a rib 430 that extends outwards toward the facing wall 416 of the housing 402 and resides above the ledge 414 of the housing 402. When the touch sensitive display subassembly 404 is touched and deflects downward, the gasket 408 moves with the touch sensitive display subassembly 404 and causes the rib 430 to travel downward towards the ledge 414 of the housing 402.

The rib 430 approaches, but usually does not contact the facing wall 416 during normal operation as the rib 430 travels between the non-contacted position shown in FIG. 4 and the contacted position shown in FIG. 5. The spacing between the tip of the rib 430 and the facing wall 416 of the housing 402 is small enough that debris is generally prevented from passing through the space therebetween, but is not so tight that the rib 430 contacts the facing wall 416. If the rib 430 were to rub against the facing wall 416, this frictional force would need to be overcome during the movement of the touch sensitive display subassembly 404. Further, as the ledge 414 extends towards the gasket 408, a second narrow area is provided between the ledge 414 and the gasket 408 which further impedes the passage of debris into the mobile device 400.

As the rib 430 is located over the ledge 414, the gasket 408 may be visible from exterior of the mobile device 400. To reduce the witness of the gasket 408, the gasket 408 may be composed of a material having a color similar to the housing 402.

In addition to protecting the mobile device 400 from debris, the gasket 408 provides impact resistance. In the form shown in FIGS. 4 and 5, the rib 430 of the gasket 408 buffers the blow of sudden side impact on the mobile device 400 as the rib 430 would be forced into contact with the facing wall 416 of the housing 402. Further, in the event of a sudden impact force being applied to the lens 426 in a downward direction (i.e., the typical direction of deflection during a touch of the touch sensitive display subassembly 404), the gasket 408 may distribute the load to carrier 420 instead of to the bezel 424 of the liquid crystal display 422, which could crack.

Figure 6:
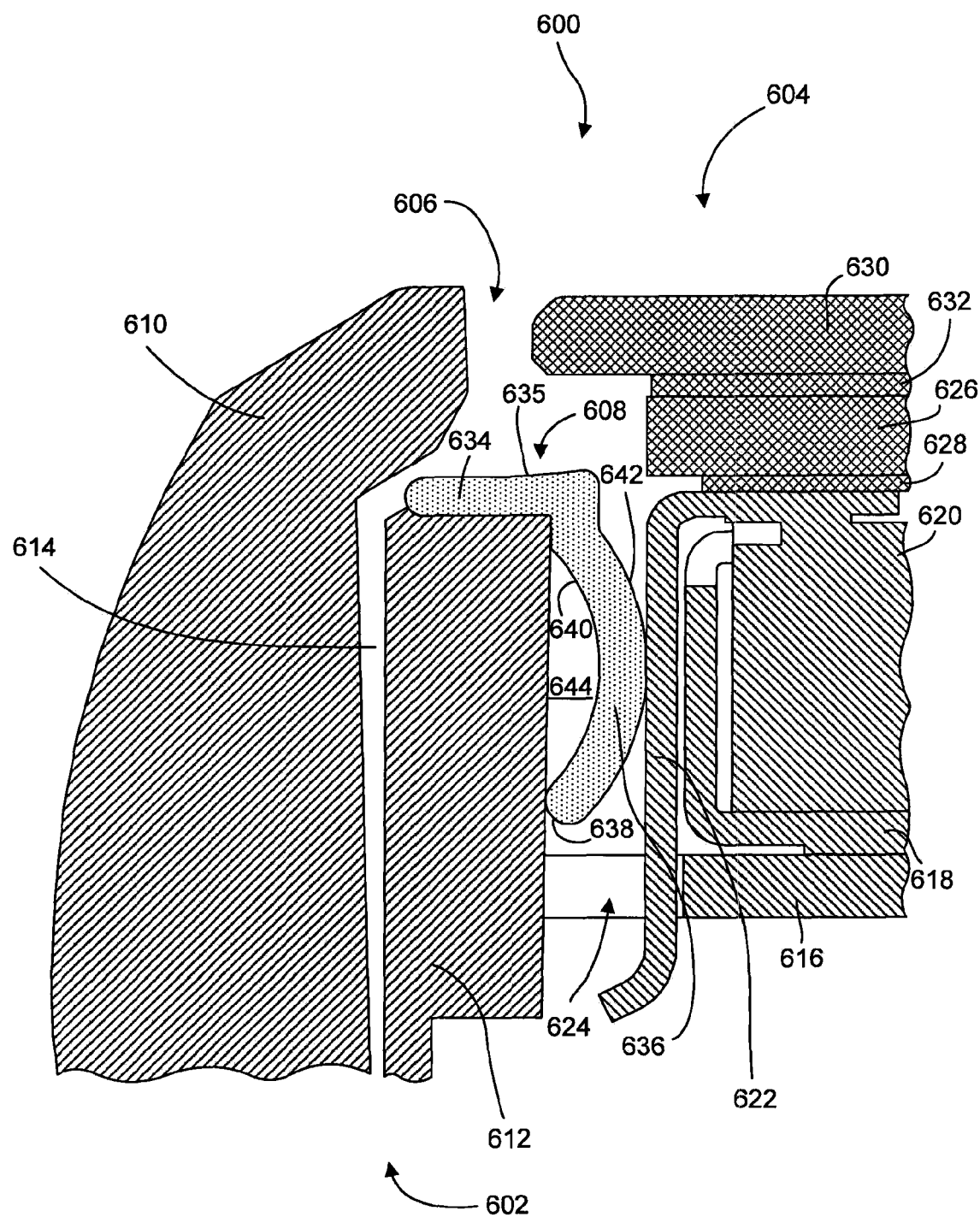
FIG. 6 is a cross-sectional view of yet another embodiment of a mobile device in which a gasket is attached to a portion of the housing and the gasket includes a shedding portion and a centering portion.
Figure 7:
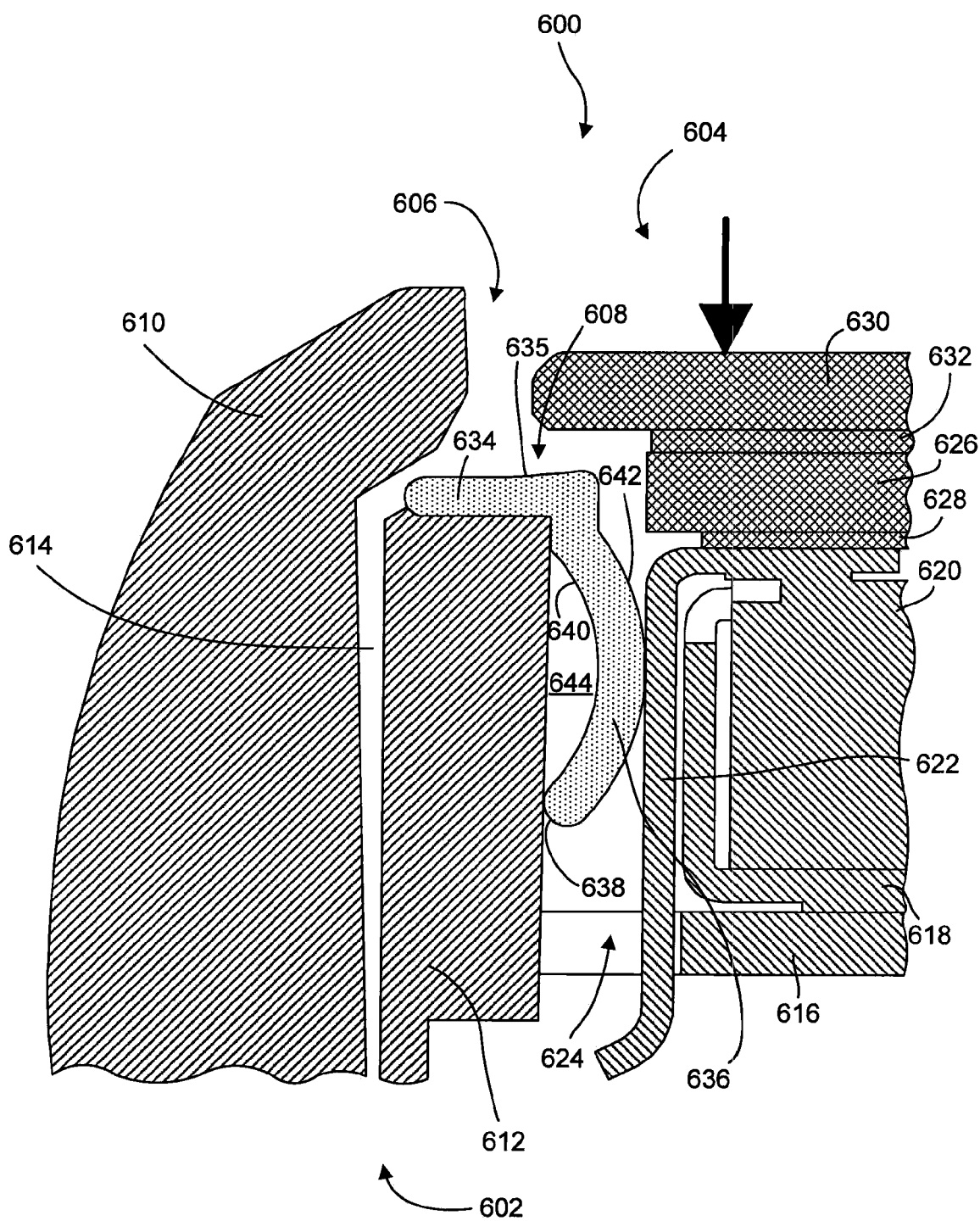
FIG. 7 is a cross-sectional view of the embodiment of FIG. 6 in which the touch sensitive display subassembly has been contacted and is depressed relative to the housing.
Figure 8:
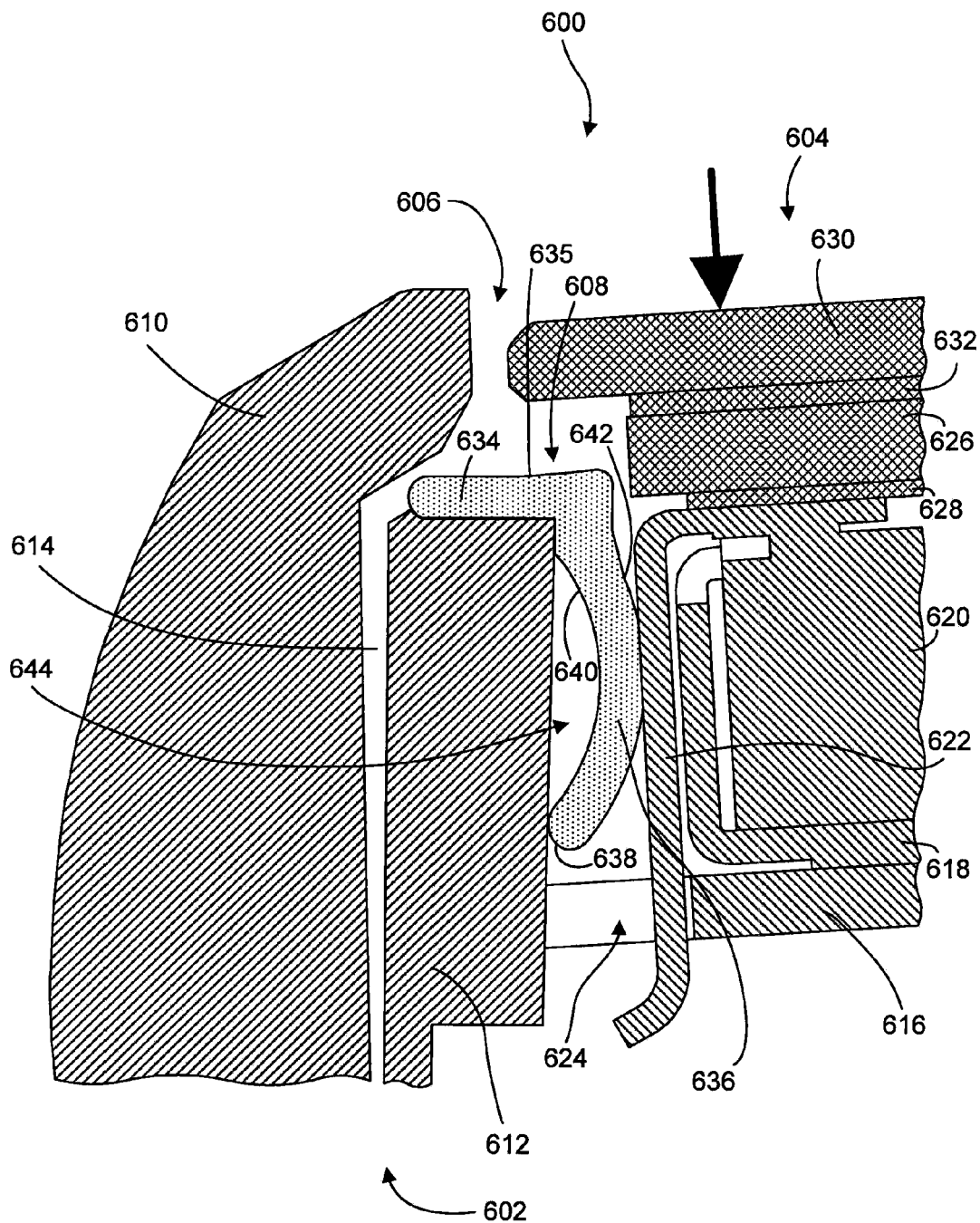
FIG. 8 is a cross-sectional view similar to FIG. 7, but in which the touch sensitive display subassembly has been depressed in such a manner as to cause the touch sensitive display subassembly to angle relative to the housing.

Referring now to FIGS. 6-8, yet another detailed cross-sectional view of a mobile device 600 is shown. Again, the mobile device 600 includes a housing 602 and a touch sensitive display subassembly 604 with a seam 606 that extends about a periphery of the touch sensitive display subassembly 604. A gasket 608 is attached to the housing 602 about the perimeter of the seam 606. It is noted that the cross section is taken through a portion of the mobile device 600 that is different than the cross sections taken in FIGS. 2-5 and hence the shape of the sections of the tray and bezel differ from the cross-sectional views shown above.

In this form, the housing 602 includes an exterior housing 610 and a interior housing 612 to which the gasket 608 is attached using an adhesive. A gap 614 exists between the exterior housing 610 and the interior housing 612. Any debris that passes through the seam 606 may be directed into this gap 614 by the gasket 608, as will be described in more detail below, to a volume of the mobile device 600 which is not sensitive to the collection of such debris or has a opening through which the debris may exit the housing 602.

The touch sensitive display subassembly 604 again includes a tray 616 that supports a carrier 618 holding the liquid crystal display 620. The liquid crystal display 620 includes a bezel 622 that extends over the edge of the carrier 618 and passes through a opening 624 in the tray 616. FIGS. 6-8 also illustrate in more detail than FIGS. 2-5 the layers overlying the liquid crystal display 620. A touch panel 626 is adhered to the bezel 622 of the liquid crystal display 620 by an adhesive layer 628. On top of the touch panel 626, a lens 630 is adhered by an adhesive layer 632. The lens 630 overhangs over the gasket 608.

Turning now to the gasket 608, the gasket 608 includes a shedding portion 634 and a centering portion 636.

The shedding portion 634 has a graded surface 635 that at least in part angles towards the gap 614. Thus, if debris passes through the seam 606, then the debris lands on the shedding portion 634 and is directed away from the touch sensitive display subassembly 604 and towards the gap 614 where the debris will do little or no harm.

In the form shown, the centering portion 636 is a curved section between the touch sensitive display subassembly 604 and the interior housing 612. The centering portion 636 extends from one side of the shedding portion 634 to a terminal end 638. Between the edge of the shedding portion 634 and the terminal end 638, the centering portion 636 includes a concave surface 640 and a convex surface 642, between which a wall of generally constant or uniform thickness is located. The convex surface 642 contacts the bezel 622 of the touch sensitive display subassembly 604 to form a sliding seal with the touch sensitive display subassembly 604, while the terminal end 638 contacts the interior housing 612. A space 644 may exist between the concave surface 640 and the interior housing 612 into which the centering portion 636 may elastically deflect.

The curved section of the centering portion 636 may provide a force which directs the touch sensitive display subassembly 604 towards the center of the portion of the housing 602 that it is received in. Depending on the geometry of the gasket 608, the centering portion 636 may be designed to exert an inward force against the touch sensitive display subassembly 604 when the touch sensitive display subassembly 604 is in a non-contacted position (such as is shown in FIG. 6). Alternatively, the gasket 608 may be formed such that it applies little or no force to the touch sensitive display subassembly 604 in the non-contacted position (not shown). In some forms, there may even be a small space between the gasket 608 and the touch sensitive display subassembly 604 (not shown), such that the resistance during operation due to contact by the gasket 608 is minimized.

As best seen in FIG. 8, sometimes a touch causes the touch sensitive display subassembly 604 to slightly skew on one edge of the touch sensitive display subassembly 604 relative to the other edges. This will cause the centering portion 636 of the gasket 608 to deflect inward while simultaneously exerting a force in the opposite direction, causing the touch sensitive display subassembly 604 to re-center once the force of the touch is removed. Again, if the centering portion 636 is preloaded, the other convex edges of the centering portion 636, which may be similarly shaped to the convex surface 642, may remain in contact with the touch sensitive display subassembly 604 even though the touch sensitive display subassembly 604 has moved away from the gasket 608.

By maintaining contact, or only the slightest of gaps with the touch sensitive display subassembly 604, the gasket 608 prevents debris from entering into the space of the touch sensitive display subassembly 604 past the centering portion 636 of the gasket 608. This protects the components of the touch sensitive display subassembly 604, thus improving the operational life of the mobile device 600.

Further, the centering portion 636 of the gasket 608 may provide impact protection in the event that the touch sensitive display subassembly 604 suddenly is jolted sideways towards the housing 602.

It should be appreciated that although the gasket 608 has been shown attached to the housing 602, that the gasket 608 having a centering portion 636 could also be attached to the touch sensitive display subassembly 604. Further, the manner in which the centering portion 636 applies a force could be different than the manner in which the curved wall of generally uniform thickness shown applies a force when the touch sensitive display subassembly 604 is skewed. For example, one side of the centering portion 636 of the gasket 608 may not be a concave surface 640 and a space 644 into which the centering portion 636 is shown as deflecting into in FIG. 8 could be solid and part of the gasket. If this was the case, the solid portion might be elastically deformable. Likewise, it is contemplated that the centering portion 636 could include multiple ridges or the like which contact one or both of the housing 602 and the touch sensitive display subassembly 604. Further, the gasket 608 may contact a portion of the touch sensitive display subassembly 604 other than the bezel 622.

It should be also be appreciated that although various cross sections have been shown, that a particular gasket may include one or more different cross sections (including cross-sectional profiles not shown) depending on the particular configuration of the mobile device and the touch sensitive display.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A mobile device comprising:
a housing;
a touch sensitive display subassembly received in the housing and movable relative to the housing, the touch sensitive display subassembly including a lens overlaying a display; and
a gasket attached to only one of the housing and the touch sensitive display subassembly, the gasket inhibiting passage of debris between the housing and the touch screen display subassembly, wherein the gasket includes:
a shedding portion located proximate a gap between the housing and the lens, the shedding portion shaped so as to direct any debris passing through the gap away from the touch sensitive display subassembly;
a centering portion that contacts a periphery of the touch sensitive display to urge the touch sensitive display subassembly toward a centered position within the housing, the centering portion being curved and at least a portion of the centering portion forming a sliding seal between the gasket and the touch sensitive display subassembly; and
wherein the centering portion includes a convex surface and extends from the shedding portion to a terminal end, the convex surface forming the sliding seal with one of the touch sensitive display subassembly and the housing and the terminal end contacts the other of the touch sensitive display subassembly and the housing.

2. The mobile device of claim 1, wherein the gasket is attached to the touch sensitive display subassembly and substantially forms a seal between a perimeter of the lens and a perimeter of the touch sensitive display subassembly to inhibit passage of debris between the lens and the display.

3. The mobile device of claim 2, wherein the gasket is located between the lens and a tray supporting the display.

4. The mobile device of claim 2, wherein the touch sensitive display subassembly is movable between a first position in which the gasket further contacts the housing to substantially form a seal between the housing and the touch sensitive display subassembly, and a second position in which at least a portion of the gasket is separated from the housing.

5. The mobile device of claim 2, wherein the gasket is located between the lens and a bezel of the display.

6. The mobile device of claim 2, wherein the gasket further includes a rib extending toward a facing wall of the housing of the mobile device to inhibit passage of debris between the housing and the touch sensitive display subassembly.

7. The mobile device of claim 1, wherein the centering portion further includes a concave surface opposing the convex surface, the concave surface facing a space between the centering portion and one of the touch sensitive display subassembly and the housing for deflection of the centering portion.

8. The mobile device of claim 7, wherein the convex surface and the concave surface define a section of the centering portion having a substantially constant wall thickness.

9. The mobile device of claim 1, wherein the gasket is composed of an elastically deformable polymeric material.

10. The mobile device of claim 1, wherein the gasket includes a rib that contacts a facing wall of the housing to cushion an impact of a drop when the mobile device is dropped, the drop causing the rib of the touch sensitive display subassembly to move laterally towards the facing wall of the housing.

11. The mobile device of claim 1, wherein the gasket is attached to the housing.

12. A mobile device comprising:
a housing;
a touch sensitive display subassembly received in the housing and movable relative to the housing, the touch sensitive display subassembly including a lens overlaying a display;
a gasket attached to the touch sensitive display subassembly and substantially forming a seal between a perimeter of the lens and a perimeter of the touch sensitive display subassembly to inhibit passage of debris between the lens and the display, the gasket including:
　a shedding portion located proximate a gap between the housing and the lens, the shedding portion shaped so as to direct any debris passing through the gap away from the touch sensitive display subassembly;
　a centering portion that contacts a periphery of the touch sensitive display to urge the touch sensitive display subassembly toward a centered position within the housing, the centering portion being curved and at least a portion of the centering portion forming a sliding seal between the gasket and the touch sensitive display subassembly; and
wherein the centering portion includes a convex surface and extends from the shedding portion to a terminal end, the convex surface forming the sliding seal with one of the touch sensitive display subassembly and the housing and the terminal end contacts the other of the touch sensitive display subassembly and the housing.

13. A mobile device comprising:
a housing;
a touch sensitive display subassembly received in the housing and movable relative to the housing, the touch sensitive display subassembly including a lens overlaying a display;
a gasket attached to the touch sensitive display subassembly and contacting and substantially forming a seal between a perimeter of the lens and a perimeter of the touch sensitive display subassembly to inhibit passage of debris between the lens and the display, the gasket including:
　a shedding portion located proximate a gap between the housing and the lens, the shedding portion shaped so as to direct any debris passing through the gap away from the touch sensitive display subassembly;
　a centering portion that contacts a periphery of the touch sensitive display to urge the touch sensitive display subassembly toward a centered position within the housing, the centering portion being curved and at least a portion of the centering portion forming a sliding seal between the gasket and the touch sensitive display subassembly; and
wherein the centering portion includes a convex surface and extends from the shedding portion to a terminal end, the convex surface forming the sliding seal with one of the touch sensitive display subassembly and the housing and the terminal end contacts the other of the touch sensitive display subassembly and the housing, and the touch sensitive display subassembly is movable between a first position in which the gasket further contacts the housing to substantially form a seal between the housing and the touch sensitive display subassembly, and a second position in which at least a portion of the gasket is separated from the housing.

\* \* \* \* \*